United States Patent
Du Rocher

[15] 3,676,815
[45] July 11, 1972

[54] THERMALLY SENSITIVE CONTROLS FOR ELECTRIC CIRCUITS

[72] Inventor: Gideon A. Du Rocher, Mount Clemens, Mich.

[73] Assignee: Essex International, Inc., Fort Wayne, Ind.

[22] Filed: July 28, 1969

[21] Appl. No.: 845,467

[52] U.S. Cl. ............................................. 337/140, 337/395
[51] Int. Cl. ................. H01h 37/32, H01h 37/50, G01k 5/48
[58] Field of Search ................ 337/123, 132, 139, 140, 395, 337/396, 393, 131, 390; 338/104, 105, 106, 114

[56] References Cited

UNITED STATES PATENTS

| | | | |
|---|---|---|---|
| 3,594,675 | 7/1971 | Willson | 337/140 |
| 3,594,674 | 7/1971 | Willson | 337/140 X |
| 3,174,851 | 3/1965 | Buehler et al. | 337/382 UX |
| 3,516,082 | 6/1970 | Cooper | 337/140 UX |
| 3,403,238 | 9/1968 | Buehler et al. | 337/140 UX |
| 3,398,233 | 8/1968 | de Lizasoain et al. | 338/114 X |
| 3,254,180 | 5/1966 | Flanagan | 337/140 X |
| 3,133,174 | 5/1964 | Greager | 337/131 |
| 2,744,981 | 5/1956 | Spears | 337/123 |
| 2,305,717 | 12/1942 | LaBell | 338/114 |

Primary Examiner—Bernard A. Gilheany
Assistant Examiner—Dewitt M. Morgan
Attorney—Learman & McCulloch

[57] ABSTRACT

A control for an electric circuit of the kind having switching means adjustable between circuit making and breaking relations and wherein the adjustment of the switching means is effected by a thermally sensitive force applying member acting on the switching means, the force exerted by the force applying member being substantially instantaneously variable in response to changes in its temperature to and from a predetermined critical temperature. The force applying member is dimensionally stable until it is heated to or cooled below its critical temperature whereupon it either expands or contracts suddenly and with the ability to do substantial work. The force applying member may either expand or contract in response to an increase in temperature depending upon the manner in which the member is formed.

17 Claims, 6 Drawing Figures

Patented July 11, 1972

3,676,815

INVENTOR.
GIDEON A. DUROCHER

BY
*Learman + McCulloch*

THERMALLY SENSITIVE CONTROLS FOR ELECTRIC CIRCUITS

The invention disclosed herein relates to thermally sensitive control means for an electric circuit and more particularly to means operable to make and break an electric circuit in response to changes in temperature. The invention is particularly adapted for use in vehicle direction signal circuits to effect periodic flashing of the signal lamps, but it has utility in many other kinds of circuits wherein thermal control of the circuit is desirable.

Conventional circuit control devices of the general class to which the invention relates primarily utilize bi-metallic elements comprising two metals having different thermal properties so that variations in temperature affect the configuration of the element. Such devices are troublesome in manufacture and in operation for a number of reasons. For example, a bimetallic element is responsive to all temperature changes, thereby resulting in a control device which creeps as its temperature varies. In many instances the force under which contacts are maintained in engagement is due directly to the configuration of a bi-metallic element and if its configuration varies with relatively small variations in temperature, the contact pressure also varies with adverse effects on the contacts. In addition, the calibration of devices incorporating bi-metallic controls is difficult due to variations in temperatures between the calibrating site and the use site so it has been common heretofore to overstress the parts of such devices so that they require the application of substantial operating forces to function. This practice in constructing known devices results in the need for component parts such as springs, special heaters, and the like, in addition to the parts required for circuit control, the additional parts being for the purpose of modifying or accentuating the normal operating tendencies of the circuit controlling parts.

Conventional control devices having exposed contacts movable into and out of engagement with one another suffer from the disadvantage that repeated making and breaking of a circuit causes deterioration of the contacts due to arcing. This characteristic of known devices is accelerated in those instances in which the relative positions of the contacts are determined by the configuration of a bi-metallic element, and especially if the configuration of the bi-metallic element varies with small changes in its temperature. To compensate for this, it has been customary heretofore to incorporate with a bi-metallic element auxiliary apparatus operable to enable the bi-metallic element to have a certain amount of lost motion followed by a snap action change of configuration so as to effect rapid movement of the contacts into and out of engagement, thereby minimizing arcing. The auxiliary structure necessary to achieve snap action operation represents an added expense, however, and further complicated calibration of the device with which it is associated.

An object of this invention is to provide thermally sensitive circuit control apparatus which overcomes or greatly minimizes the disadvantages of previously known devices.

Another object of the invention is to provide a thermally sensitive circuit control device having a force applying member which is either expansible or contractile in response to an increase in temperature.

A further object of the invention is to provide a device of the character referred to in which the thermal expansion or contraction of the force applying member is negligible until such time as its temperature has been raised to a predetermined critical temperature.

Another object of the invention is to provide a thermally sensitive control device of the kind described which avoids the necessity of auxiliary control means and which eliminates to a large degree any need for calibration.

Another object of the invention is to provide a circuit control device having engageable and disengageable relatively movable contacts and wherein means is provided not only to effect relative movement of such contacts, but also to maintain them under relatively high pressure when they are engaged, thereby contributing to longer contact life.

Other objects and advantages of the invention will be pointed out specifically or will become apparent from the following description when it is considered in conjunction with the appended claims and the accompanying drawings, in which:

Figure 1:
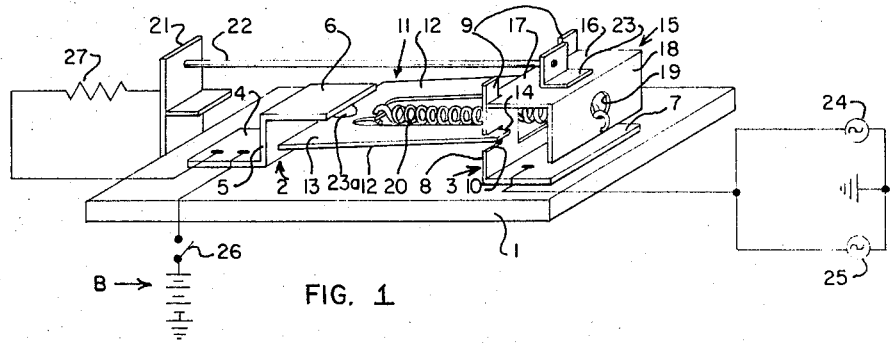
FIG. 1 is an isometric view of a control device constructed in accordance with one embodiment with the invention, the circuit to be controlled being illustrated schematically.

In each of the embodiments hereinafter described the operation of the apparatus depends upon the utilization of a force applying member formed of a nickel-titanium alloy known as nitinol and which possesses properties uniquely suited to constructions of the kind disclosed herein. For example, a nitinol wire when subjected to heat is substantially stable dimensionally until such time as a predetermined and critical temperature is reached, at which time the wire undergoes a transition that produces a substantial change in its dimensions. The extent of longitudinal dimensional change may be predicted according to the composition of the alloy. For example, a pure stoichiometric (50 atomic percent) TiNi alloy has a nickel content of approximately 55 percent by weight and when heated to its critical temperature undergoes a dimensional change up to 8 percent with complete recovery following cooling below its critical temperature.

The dimensional change in a nitinol wire when it is heated through its critical temperature may be either expansive or contractile, depending upon the manner in which the wire is formed. If the wire is formed by a process, such as swaging, forging, rolling and the like, which subjects the alloy to predominately compressive stresses, heating the wire from a temperature below its critical temperature to a temperature at or above its critical temperature will cause the wire to expand in length. On the other hand, if the nitinol wire is produced by a process, such as drawing, which subjects the alloy to predominately tensile stresses, heating of the wire from a temperature below its critical temperature to a temperature at or above its critical temperature will cause the wire to contract in length. In each instance, reduction of the temperature of the wire to one below its critical temperature restores the wire to its original dimensions.

A particularly advantageous characteristic of nitinol alloys of the kind discussed is that the dimensional change occurs extremely rapidly at the critical temperature. Thus, the heating of a wire from a temperature below its critical temperature to a temperature above its critical temperature, and vice versa, causes a sudden dimensional change in the wire which is capable of performing substantial work.

The critical temperature of a particular alloy is directly related to the proportions of nickel and titanium of which the alloy is composed. Below is a table listing approximate critical temperatures of typical nitinol alloy compositions wherein the alloy is composed of commercially pure nickel and commercially pure titanium in the proportions indicated:

| Wt. % Ni. | Wt. % Ti. | Critical Temperature °C. |
|---|---|---|
| 53.5 | 46.5 | 98 |
| 54.0 | 46.0 | 140 |
| 54.5 | 45.5 | 170 |
| 55.0 | 45.0 | 140 |
| 55.5 | 44.5 | 30 |
| 56.0 | 44.0 | −25 |
| 56.5 | 43.5 | −50 |

The data presented in the table are not intended to be exhaustive, but are intended to illustrate that varying the Ni-Ti proportions produces marked changes in the critical temperature of the alloy.

The approximate extent of elongation and contraction of nitinol wire may be predicted from the testing of a sample of such wire. For example, heating a 0.02 diameter tensile or compressive-formed nitinol wire formed of 50.3 weight percent to its critical temperature resulted in a change in length amounting approximately to 7 percent of the total original length, the tensile-formed wire contracting and the compressive-formed wire expanding. Cooling of the wire below its critical temperature causes it to return to its original length.

Figure 2:
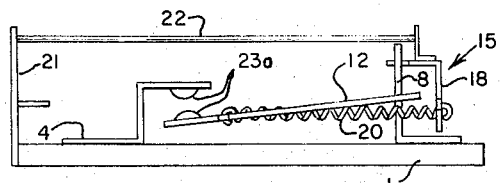
FIG. 2 is a side elevational view of the apparatus shown in FIG. 1 and illustrating the circuit making and breaking contacts in disengaged relation.
Figure 3:
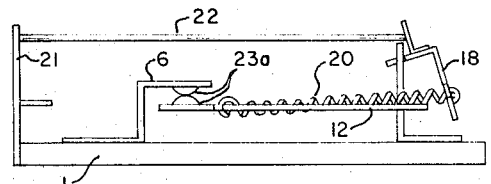
FIG. 3 is a view similar to FIG. 2, but illustrating the contacts in engaged relation.

Apparatus constructed in accordance with the embodiment of the invention illustrated in FIGS. 1–3 comprises a base 1 formed of any suitable insulating material and on which is mounted a pair of spaced apart, electrically conductive bracket members 2 and 3. The member 2 has a mounting flange 4 from one end of which extends an upstanding flange 5 terminating at its upper end in a lip 6 which overhangs the base 1. The member 3 comprises a mounting flange 7 terminating at one end in an upstanding, U-shaped arm 8 notched at its upper end to form a pair of spaced apart legs 9. Each of the legs 9 also has a notch 10 therein between its ends.

Fulcrummed on the member 3 for rocking movement is a U-shaped, electrically conductive blade 11 having a pair of parallel legs 12 joined at one end by a web 13, the opposite end of each leg being notched to provide a tongue 14 which projects through the associated notch 10. Also fulcrummed on the member 3 for rocking movements is a right-angular, electrically conductive force transmitting member 15 having an upper flange 16 notched adjacent its opposite ends to provide a tongue 17 that fits between the legs 9 and is supported by the notched upper edge of the arm 8. The member 15 also includes a vertical flange 18 having an opening 19 therein in which is fixed one end of a tension spring 20. The opposite end of the spring 20 is fixed to the web 13 of the blade 11.

Fixed to the base 1 is an upstanding, electrically conductive anchor member 21 to which is fixed one end of an electrically conductive, force applying member 22 formed of nitinol. The opposite end of the member 22 is fixed to a bracket 23 that is carried by the force transmitting member 15. In this embodiment the member 22 is a wire formed by a tensile process such as drawing and is stressed 8 percent by the spring 20.

The arm 6 and the blade 11 are provided with electrically conductive switching means comprising contact buttons 23a which are adapted to engage one another in response to movement of the blade 11 from the position shown in FIG. 2 to the position shown in FIG. 3. The manner in which the movement of the blade 11 is effected constitutes an important characteristic of the invention and will be described in detail presently.

FIG. 1 illustrates, in simplified form, an electrical circuit of the kind which may be utilized to effect flashing of a pair of vehicle direction signaling lamps 24 and 25, corresponding terminals of which are grounded and the other corresponding terminals of which are connected to the member 3. A manually operable switch 26 is connected to one terminal of an energy source such as a battery B which has its other terminal grounded. Connected between the member 2 and the member 21 is a resistance 27 by means of which battery potential may be supplied to the member 22 under certain conditions.

In the operation of the apparatus shown in FIGS. 1–3, the blade 11 has a normal position corresponding to that shown in FIGS. 1 and 2 in which the contacts 23a are disengaged. When the switch 26 is closed, a current path will be established from the battery through the switch 26 to the member 2 and from that latter through the resistor 27 to the member 21. From the member 21 the current path is through nitinol wire 22 to the member 15 and through the member 3 to the lamps 24 and 25. The resistance of the resistor 27 is selected to limit the current to an amount insufficient to illuminate the lamps 24 and 25, but to assure that the current passed by the resistor is sufficient to heat the element 22 to its critical temperature, whereupon it contracts. Contraction of the element 22 rocks the member 15 counterclockwise from the position shown in FIG. 2 to the position shown in FIG. 3 thereby causing the right hand end of the spring 20 to be swung through and above the plane of the blade 11, whereupon the blade rocks clockwise to effect forcible engagement of the contacts 23A. Upon engagement of the contacts 23A, the blade 11 shunts the resistor 27 and current may flow from the member 4 through the blade 11 and through the member 3 to the lamps 24 and 25 to effect illumination of the latter. When the resistor 27 is shunted, current no longer passes through the element 22, whereupon the latter will cool to a temperature below its critical temperature and expand. The expansion of the member 22 will enable the spring 20 to rock the member 15 clockwise from the position shown in FIG. 3, thereby shifting the spring 20 downwardly through the plane of the blade 11 to rock the blade counterclockwise and disengage the contacts 23A. Thereafter, the cycle is repetitive so as to effect flashing of the lamps 24 and 25. The contraction and expansion of the member 22 as its temperature varies above and below, respectively, its critical temperature is rapid so as to effect sudden rocking movements of the member 15 and, consequently, rapid movements of the blade 11 into and out of contact engagement. The blade 11, therefore, has a snap action which minimizes wear of the contacts 23A due to arcing.

One of the advantageous characteristics of the apparatus is that it does not require precise calibration for proper operation. All that is essential for the operation of the device is that the arc through which the force transmitting member 15 rocks be sufficient to shift the spring 20 from one side of the plane of the blade 11 to the other side, and vice versa. It does not matter how far above or below the plane of the blade 11 the spring is shifted, so there is no particular or critical limit to the arcuate length of the rocking movement imparted to the member 15. Consequently, the length of the element 22 may be so selected that, when the element is cool, i.e., at a temperature below its critical temperature, the position of the member 15 is such as to maintain a spring 20 at a level below the plane of the blade. The length of the element 22 also will be so selected with reference to the contraction it undergoes when heated to its critical temperature as to assure rocking of the member 15 through a sufficient arc to shift the blade 11 and effect engagement of the contacts 23A. Any excess of rocking movement of the member 15 will be absorbed by the spring 20.

The spring 20 preferably is maintained under tension at all times so as to exert a biasing force on the blade 11 tending to maintain it in either of the positions to which it has been shifted. The tensioning of the spring, coupled with the virtual absence of dimensional creep of the member 22 during temperature changes either above or below the critical temperature, provides a dual control on the blade 11 to prevent rebounding or fluttering of the contacts 23A when they are moved into and out of engagement.

Figure 4:
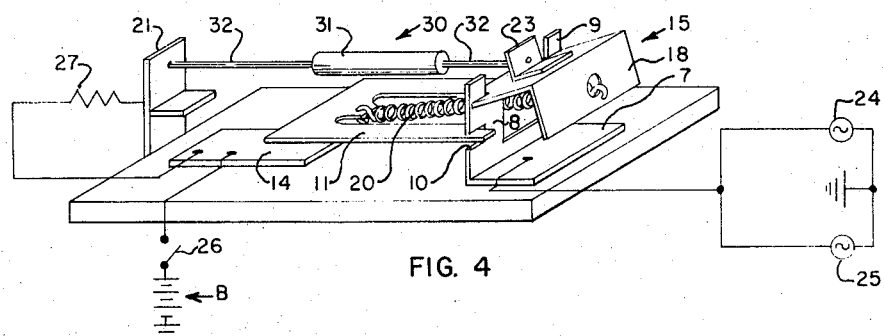
FIG. 4 is a view similar to FIG. 1, but illustrating a modified form of the invention.
Figure 5:
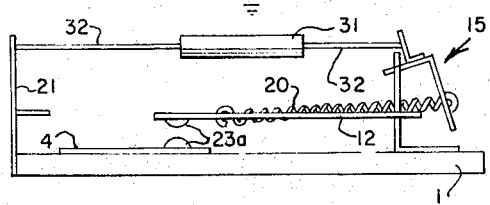
FIG. 5 is a side elevational view of the apparatus shown in FIG. 4 and illustrating the contacts in disengaged relation.
Figure 6:
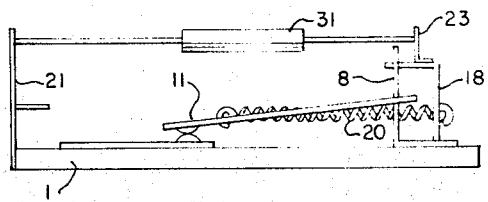
FIG. 6 is a view similar to FIG. 5, but illustrating the contacts in engaged relation.

The apparatus shown in FIGS. 4–6 is similar in many respects to the previously described embodiment and similar parts are identified by similar reference characters. The principal difference between the two embodiments is that, in the FIGS. 4–6 embodiment, the rocking of the member 15 is controlled by a thermally sensitive, dimensionally variable force applying member 30 comprising a nitinol element 31 sandwiched between electrically conductive copper rods 32.

The nitinol element 31 is formed by a process producing substantially compressive stresses in the member 31 with the result that, upon heating of the element 31 to and above its critical temperature, it expands or elongates. Conversely, cooling of the element 31 below its critical temperature results in contraction of the element.

In the normal or inactive condition of the apparatus, the element 31 is at a temperature below its critical temperature and the overall length of the member 30 is such as to hold the member 15 in a position in which the spring 20 is above the plane of the blade 11 and the latter is in a position in which the contacts 23A are disengaged. Upon closing the switch 26, current is supplied to the member 30 via the resistor 27 so as to heat the element 31 to its critical temperature, whereupon it expands suddenly and rocks the member 15 clockwise to shift the blade 11 counterclockwise and engage the contacts 23A. In all other respects the operating characteristics of the apparatus are the same as those of the earlier described embodiment.

The disclosed embodiments are representative of presently preferred forms of the invention, but are intended to be illustrative rather than definitive thereof. The invention is defined in the claims.

I claim:

1. Thermally sensitive control apparatus for an electric circuit comprising switching means adjustable from conductive condition to non-conductive condition and vice versa; thermally sensitive self-restoring force applying means acting on said switching means and responsive to a change in temperature to and from a predetermined temperature to change dimensions, thereby to vary the force exerted on said switching means and effect adjustment of said switching means from one of said conditions to the other, and return, said force applying means being substantially stable dimensionally at ambient temperatures below said predetermined temperature; and means for varying the temperature of said force applying means to and from said predetermined temperature.

2. The apparatus set forth in claim 1 wherein the normal condition of said switching means is non-conductive.

3. The apparatus set forth in claim 1 including yieldable biasing means for yieldably maintaining said switching means in said non-conductive condition.

4. The apparatus set forth in claim 3 wherein said biasing means is operable yieldably to bias said contact means toward said conductive condition following adjustment thereof from said non-conductive condition.

5. The apparatus set forth in claim 1 wherein said force applying means expands in response to an increase in temperature to said predetermined temperature.

6. The apparatus set forth in claim 5 wherein said force applying means contracts in response to a decrease in temperature from said predetermined temperature.

7. The apparatus set forth in claim 1 wherein said force applying means contracts in response to an increase in temperature to said predetermined temperature.

8. The apparatus set forth in claim 7 wherein said force applying means expands in response to a decrease in temperature from said predetermined temperature.

9. The apparatus set forth in claim 1 wherein said force applying means is electrically conductive.

10. The apparatus set forth in claim 9 wherein the means for changing the temperature of said force applying means comprises an electric circuit of which said force applying means is a part.

11. The apparatus set forth in claim 10 including means for electrically bypassing said force applying means when said switching means is in said conductive condition.

12. The apparatus set forth in claim 1 wherein said force applying means comprises an electrical conductor formed by a tensile process.

13. The apparatus set forth in claim 12 wherein said conductor is formed of nitinol.

14. The apparatus set forth in claim 1 wherein said force applying means comprises an electrical conductor formed by a compression process.

15. The apparatus set forth in claim 14 wherein said conductor is formed of nitinol.

16. The apparatus set forth in claim 1 wherein said switching means comprises first and second contacts at least one of which is movable into and out of engagement with the other.

17. The apparatus set forth in claim 1 including spring means interposed between said force applying means and said switching means and exerting a force on said force applying means in one condition of said switching means tending to elongate said force applying means.

* * * * *